United States Patent
Wu et al.

(10) Patent No.: US 8,363,525 B1
(45) Date of Patent: Jan. 29, 2013

(54) DISC DRIVE TESTING DEVICE AND TEST METHOD

(75) Inventors: Rui-Qiang Wu, Shenzhen (CN); Ya-Guo Wang, Shenzhen (CN); Hong-Yan Liu, Shenzhen (CN); Jun Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/326,666

(22) Filed: Dec. 15, 2011

(30) Foreign Application Priority Data

Sep. 13, 2011 (CN) .......................... 2011 1 0269354

(51) Int. Cl.
*G11B 7/00* (2006.01)

(52) U.S. Cl. .................................. 369/53.1; 369/47.33

(58) Field of Classification Search ................. 369/53.1, 369/53.31, 47.1, 47.33, 53.12, 53.32, 53.33, 369/53.42; 356/124; 714/718, 719
See application file for complete search history.

(56) References Cited

U.S. PATENT DOCUMENTS 5,748,589 A * 5/1998 Shimizu ....................... 369/53.2

* cited by examiner

*Primary Examiner* — Nabil Hindi
(74) *Attorney, Agent, or Firm* — Altis Law Group, Inc.

(57) ABSTRACT

A testing device for testing read performance of a disc drive, includes a receiving unit, a cache and a detecting unit. The receiving unit receives images obtained by the disc drive. The cache temporarily stores the received images. The detecting unit detects the number of the images in the cache and generates a detecting signal to indicate that there is an abnormity if the number of the images in the cache is less than a preset value. A test method for testing read performance of disc drive is also provided.

11 Claims, 2 Drawing Sheets

DISC DRIVE TESTING DEVICE AND TEST METHOD

BACKGROUND

1. Technical Field

The present disclosure relates to testing devices and, particularly, to a disc drive testing device and a test method to test read performance of disc drives.

2. Description of Related Art

A method for testing read performance of a disc drive is: during the reading of the data by an optical disc, an operator observes data displayed on a display screen to determine whether there is an abnormity, for example, Mosaic phenomena. If the number of abnormities reaches a preset value, the operator may determine that the read performance of the disc drive is unsatisfactory. This test method needs to be continuously monitored by an operator, and over a period of time the operator may feel tired, and may result in error or misjudgment.

Therefore, there is room for improvement in the art.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure will now be described in detail with reference to the drawings.

Figure 1:
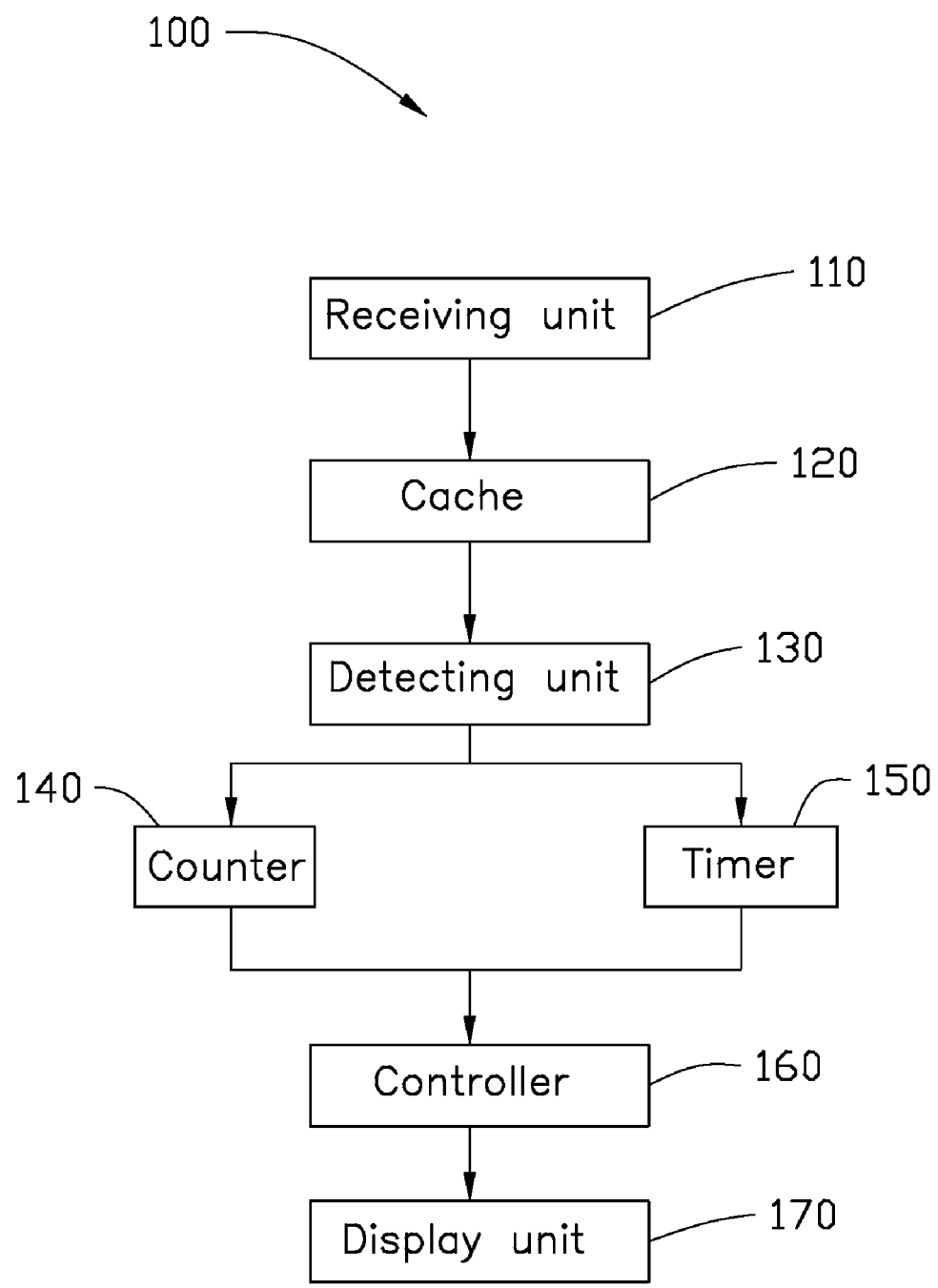
FIG. 1 is a block diagram of a disc drive testing device in accordance with an embodiment.

FIG. 1, is an embodiment of a disc drive testing device 100 for testing read performance of disc drives (not shown) is illustrated. A predetermined optical disc storing a quantity of information is provided for the testing device 100 to test read performance of disc drives. In the embodiment, the predetermined optical disc storing a number of images is provided for the testing device 100 to test read performance of disc drives. In alternative embodiments, an optical disc storing audio files or video files can also be employed to test read performance of disc drives. When a disc drive reads images from the optical disc, the testing device 100 determines whether there is an abnormity to judge the read performance of the disc drive. The more occurrences of the abnormities, the worse the read performance of the disc drive.

The testing device 100 includes a receiving unit 110, a cache 120, a detecting unit 130, a counter 140, a timer 150, a controller 160, and a display unit 170. The display unit 170 is for displaying information, such as, images, video, and test result obtained by the testing device 100. The receiving unit 110 is for receiving images obtained from the predetermined optical disc by the disc drive. The cache 120 is for temporarily storing the received images. When there is abnormity while the disc drive reads images from the optical disc, the receiving unit 110 cannot receive images or receives few images from the optical disc, thus the number of images in the cache 120 is zero or few.

The detecting unit 130 is for detecting the number of images in the cache 120. If the number of images in the cache 120 is less than a preset value, the detecting unit 130 determines there is an abnormity and outputs an detecting signal.

The counter 140 sequentially records the abnormity in response to the detecting signal. For example, if the counter 140 receives the first detecting signal, the counter 140 records as, "the first abnormity", and if the counter 140 receives the fourth detecting signal, the counter 140 records as, "the fourth abnormity", accordingly, if the counter 140 receives the Nth detecting signal, the counter 140 records as, "the Nth abnormity".

The timer 150 is adapted to record the occurrence time of each abnormity and a time duration of each abnormity. The longer the duration of one abnormity, the worse the read performance of the disc drive. Otherwise, the shorter the duration of one abnormity, the better the read performance of the disc drive. The timer 150 further times the duration of the testing of the disc drive, and generates an end signal if the duration of the testing of the disc drive reaches a predetermined time interval, for example, T0.

The controller 160 pauses the testing of the disc drive in response to the end signal. When the process of testing the disc drive is paused, the controller 160 counts all the recorded abnormities to obtain the number of occurrences of abnormities and displays the number of occurrences of abnormities. The controller 160 further displays each abnormity, occurrence time of each abnormity and the duration of each abnormity on the display unit 170.

As a result, based on the counted number of occurrences of abnormity, the occurrence time of each abnormity and the duration of each abnormity, an operator can easily determine the read performance of the disc drive.

Figure 2:
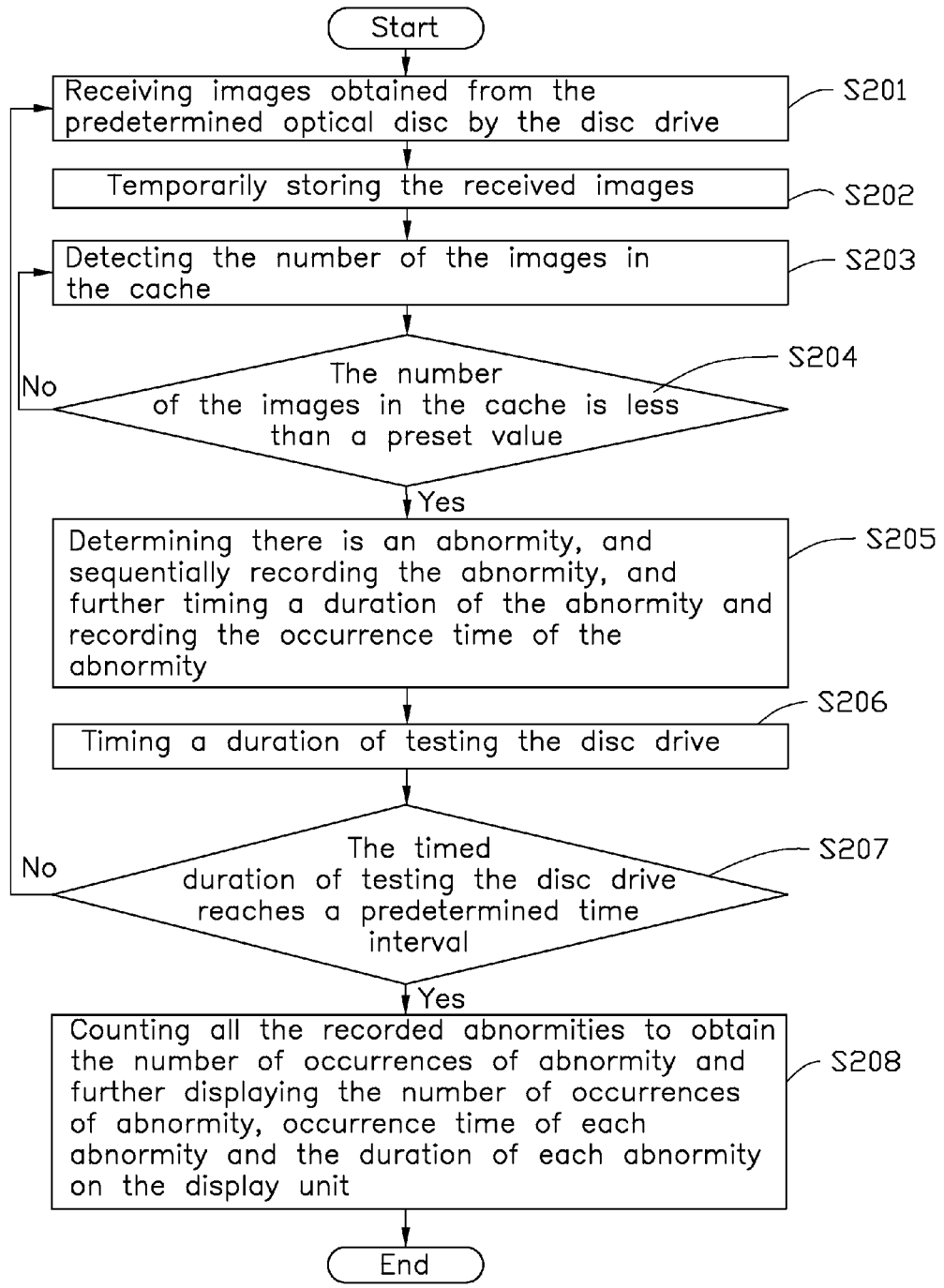
FIG. 2 is a flowchart of a test method for testing a disc drive in accordance with an embodiment.

FIG. 2 is a flowchart of a test method for testing read performance of a disc drive in accordance with an embodiment. The test method includes the following steps:

In step S201, the receiving unit 110 receives images obtained from the predetermined optical disc by the disc drive.

In step S202, the cache 120 temporarily stores the received images.

In step S203, the detecting unit 130 detects the number of images in the cache 120.

In step S204, the detecting unit 130 further determines whether the number of the images in the cache 120 is less than a preset value. If the number of the images in the cache 120 is detected to be less than the preset value, the procedure goes to S205, and if the number of the images in the cache 120 is not less than the preset value, the procedure returns to S203.

In step S205, the detecting unit 130 determines there is an abnormity if the number of the images in the cache 120 is detected to be less than the preset value, the counter 140 sequentially records the abnormity, and the timer 150 times a duration of the abnormity, and records the occurrence time of the abnormity.

In step S206, the timer 150 further times a duration of the testing of the disc drive.

In step S207, the timer 150 further determines whether the timed duration reaches a predetermined time interval. If the timed duration reaches the predetermined time interval, the procedure goes to step S208, and if the timed duration does not reach the predetermined time interval, the procedure returns to step S201.

In step S208, the timer 150 generates an end signal if the timed duration reaches the predetermined time interval, the controller 160 pauses the testing of the disc drive in response to the end signal. In addition, the controller 160 counts all the recorded abnormities to obtain the number of occurrences of abnormities and further displays the number of occurrences of abnormities, occurrence time of each abnormity and the duration of each abnormity on the display unit 170.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A testing device for testing read performance of a disc drive, comprising:
   a receiving unit for receiving images obtained by the disc drive;
   a cache for temporarily storing the received images; and
   a detecting unit for detecting the number of the images in the cache and generating a detecting signal to indicate that there is an abnormity if the number of the images in the cache is less than a preset value.

2. The testing device as described in claim 1, further comprising a counter, wherein the counter sequentially records the abnormity in response to the detecting signal.

3. The testing device as described in claim 2, further comprising a timer, wherein the timer times the occurrence time of each abnormity in response to the detecting signal.

4. The testing device as described in claim 3, wherein the timer further times a duration of each abnormity in response to the detecting signal.

5. The testing device as described in claim 4, wherein the timer further times a duration of the testing of the disc drive and generates an end signal if the timed duration reaches a predetermined time interval.

6. The testing device as described in claim 5, further comprising a controller and a display, wherein the controller pauses the testing of the disc drive in response to the end signal, and counts all the recorded abnormities to obtain the number of occurrences of abnormities, and further displays the number of occurrences of abnormities, occurrence time of each abnormity and the duration of each abnormity on the display unit.

7. A test method for testing read performance of a disc drive, the disc drive comprising a cache for temporarily storing images obtained from an optical disc by the disc drive, the method comprising:
   receiving images obtained by the disc drive;
   temporarily storing the received images; and
   detecting the number of the images in the cache and generating a detecting signal to indicate that there is an abnormity if the number of the images in the cache is less than a preset value.

8. The test method as described in claim 7, further comprising:
   sequentially recording the abnormity in response to the detecting signal;
   counting the recorded abnormity to obtain the number of occurrences of the recorded abnormities; and
   displaying the counted number of occurrences of the recorded abnormities.

9. The test method as described in claim 7, further comprising:
   recording the occurrence time of each abnormity in response to the detecting signal; and
   displaying the occurrence time of each abnormity.

10. The test method as described in claim 7, further comprising:
    timing a duration of each abnormity; and
    displaying the timed duration of each abnormity.

11. The test method as described in claim 7, further comprising:
    timing a duration of the testing of the disc drive;
    generating an end signal if the timed duration of testing the disc drive reaches a predetermined time interval; and
    pausing the testing of the disc drive in response to the end signal.

* * * * *